April 28, 1925.
J. M. DAPRON
1,535,455
AIR BRAKE EQUIPMENT
Filed June 4, 1923
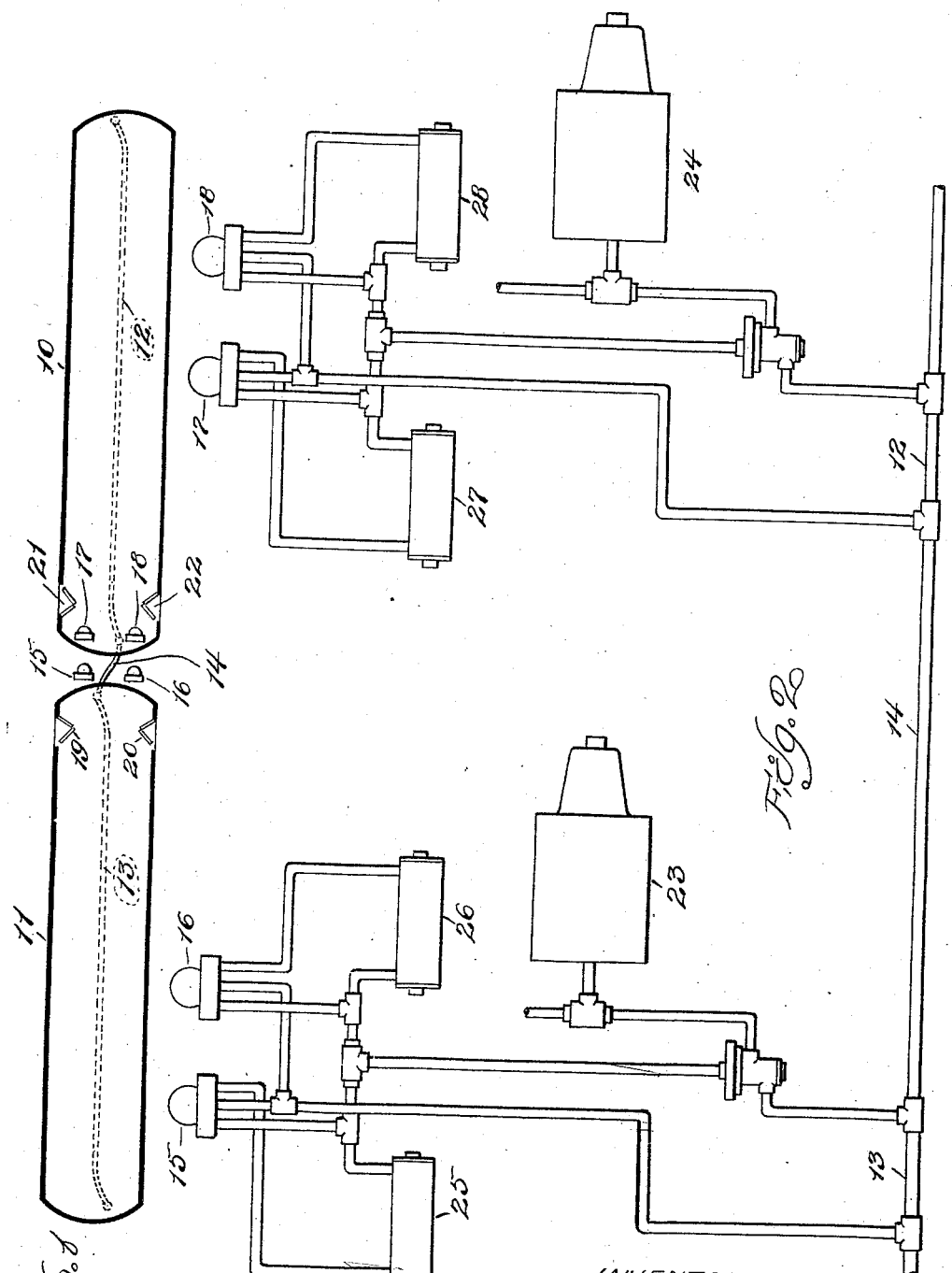

Patented Apr. 28, 1925.

1,535,455

UNITED STATES PATENT OFFICE.

JOSEPH M. DAPRON, OF ST. LOUIS, MISSOURI.

AIR-BRAKE EQUIPMENT.

Application filed June 4, 1923. Serial No. 643,413.

*To all whom it may concern:*

Be it known that I, JOSEPH M. DAPRON, a citizen of the United States of America, residing at the city of St. Louis, in the State of Missouri, have invented certain new and useful Improvements in Air-Brake Equipments, of which the following is a specification, reference being had therein to the accompanying drawing.

My invention relates to air brake equipment for passenger vehicles and has for its object to provide means for the operation, by a single operator, of interlocking pneumatic door control and brake mechanism of two vehicles in series.

Drawings.

In the drawings Fig. 1 is a diagrammatic plan view of two adjacent passenger vehicles indicating the brake pipe and the location of the door-control valves.

Fig. 2 is an isometric diagram indicating the several elements involved in my invention, and their connections.

Description.

As shown in Fig. 1 a forward vehicle 10 is coupled to a rear vehicle 11 in the usual manner, the brake pipes 12 and 13 being connected by a flexible coupling 14.

On the outer face of the front end of the rear vehicle 11 I provide the control valves 15 and 16 and within the rear end of the vehicle 10, I provide the control valves 17 and 18, the doors 19, 20, 21 and 22 being operable by means of that one of the said valves which is located nearest thereto. Brake cylinders 23 and 24 are provided on each of said vehicles; cylinder 23 being operable by either of the control valves 15 or 16 simultaneously with the operation of either of the door engines 25 or 26. Similarly the brake cylinder 24 is actuated in unison with either of the door engines 27 or 28; with the result that cylinder 23 will apply and set its brakes upon either of the door engines 25 or 26 being operated to open its adjacent door 19 or 20. Thus, also, the brake cylinder 24 is actuated to apply its brakes when the door engine 27 is actuated by the control valve 17 to open the door 21; or when the door engine 28 is actuated by the control valve 18 to open the door 22.

Mode of operation.

The brakes being so set by the opening of either door, cannot be released except by the return of the opened door to closed position. Under the arrangement illustrated in Fig. 2 the brake pipes 12 and 13 being properly coupled by the coupler 14, the opening of either door on either vehicle will apply the brakes of both vehicles.

The positive opening action of either of the door engines of the rear vehicle 11 such as engine 25 actuating the door 19 to open it, by the force of air admitted by the action of the control valve 15 exhausts from the brake pipe 12 actuating the brake cylinder 23 to apply the brakes on the vehicle 11; the exhaust so effected from the pipe 13 serves to exhaust the brake pipe 12 through the flexible coupling 14, with the effect of actuating the brake cylinder 24 to set the brakes on the forward vehicle 10; and similarly will actuate the brakes on any number of other vehicles connected as are the two illustrated.

Claims.

I claim—

1. The improvement in air brake equipment comprising a series of air-brake equipped vehicles; one or more doors on each of said vehicles; and means arranged to apply the brakes by the opening of either door of either car, and to disengage said brakes by the closing of said door.

2. The improvement of the class described comprising means for applying the brakes of a train of vehicles by the opening of a door in either car of said train and holding said brakes in set position until all the doors of all the cars comprising said train are closed.

3. The improvement in air brake equipment comprising a series of vehicles forming a train; means for applying the brakes of said train by the opening of a door in any car of said train; and means actuated by the closing of said door to release said brakes.

In testimony whereof I have hereunto affixed my signature.

JOSEPH M. DAPRON.